United States Patent

[11] 3,628,804

[72] Inventor Ronald Carreiro
 173 Bay St., Taunton, Mass. 02780
[21] Appl. No. 865,064
[22] Filed Oct. 9, 1969
[45] Patented Dec. 21, 1971

[54] SNOW SURFBOARD
 7 Claims, 5 Drawing Figs.
[52] U.S. Cl. .................................................. 280/18,
 280/11.13 S
[51] Int. Cl. ...................................................... B62b 13/00
[50] Field of Search .......................................... 280/12 B,
 18, 19, 11.39

[56] References Cited
 UNITED STATES PATENTS

| | | | |
|---|---|---|---|
| 2,181,391 | 11/1939 | Burgeson et al. | 280/18 |
| 2,450,285 | 9/1948 | Lidberg | 280/18 |
| 2,781,200 | 2/1957 | Robison | 280/11.39 |
| 3,374,003 | 3/1968 | Fulsom | 280/18 |
| 3,378,275 | 4/1968 | Rockwood et al. | 280/18 |

FOREIGN PATENTS

| | | | |
|---|---|---|---|
| 211,680 | 10/1960 | Austria | 280/12 |

*Primary Examiner*—Benjamin Hersh
*Assistant Examiner*—Winston H. Douglas
*Attorney*—Morse, Altman & Oates ABSTRACT: An elongated horizontal board for standing upon with both feet and of a length approximately five to six times the length of the average shoe and of a width approximately two to three times the length of an average shoe. The forward end of the board is rounded in plan shape and slightly upwardly curved and the rear opposite side marginal edge portions of the board are slightly rearwardly convergent. The rear end quarter of the board is inclined approximately 20° rearwardly and upwardly and includes at least one depending brake member engageable with a surface over which the board is moving when the board is excessively rocked backward over a fulcrum area thereof defined at the juncture of the rear end quarter and forward portion of the board. When the board is rocked moderately rearwardly over the fulcrum area lateral foot pressure in opposite directions in opposite sides of the fulcrum area may be utilized to angularly displace the board about an upstanding axis passing through the fulcrum area for steering purposes.

PATENTED DEC 21 1971 3,628,804

Ronald Carreiro
INVENTOR.

BY Clarence A. O'Brien
and Harvey B. Jacobson
Attorneys 3,628,804

SNOW SURFBOARD

The snow surfboard of the instant invention is designed to be used on snow covered surfaces the same way a surfboard is used in water. At first glance, the appearance of the snow surfboard generally resembles the appearance of a surfboard. However, closer inspection will reveal a removable skeg, forwardly and upwardly inclined nose, and a concave top as well as a rearwardly and downwardly inclined brake member carried by the rear terminal end of a rearwardly and upwardly inclined rear end portion of the board. The brake member is designed to engage the snow surface over which the board is moving when downward foot pressure is applied to the rear end portion of the board for pivoting the latter rearwardly about a fulcrum area defined at the juncture between the rearwardly and upwardly inclined rear end portion of the board and the forward portion of the board. Further, the forward end of the board is curved slightly upwardly and the top of the board is covered with a nonskid material.

While the general shape of the snow surfboard will be retained substantially the same, the board may be produced in various sizes, according to the weight and size of the intended user of the board.

The snow surfboard may be constructed of various materials such as plastic, aluminum, wood or various fiber materials such as fiber glass and waterproof fiberboard.

The object of this invention is to provide a vehicle for traveling over snow which is similar to a surfboard but which includes structural features which differ from a surfboard and particularly well adapt the snow surfboard for use on snow-covered surfaces.

Another object of this invention is to provide a snow surfboard in accordance with the immediately preceding object and which may be readily manufactured in various sizes according to the size and weight of the intended user of the board.

A further object of this invention is to provide a snow surfboard designed in a manner whereby it is provided with rear braking means which may be brought into action only upon the user of the board leaning his weight toward the rear of the board whereby it will be unlikely that the user of the board may be thrown from the front end of the board as a result of excessive braking inasmuch as any tendency of the rider of the board to have his weight shifted forwardly will decrease the braking action of the board.

Yet another important object of this invention is to provide a snow surfboard constructed in a manner whereby the rider of the board having his feet engaged with longitudinally spaced portions of the board may apply lateral foot pressure in opposite directions in order to pivot the board about an upstanding axis for steering purposes.

A final object of this invention to be specifically enumerated herein is to provide a snow surfboard which will conform to conventional forms of manufacture, be of simple construction and enjoyable to use so as to provide a device that will be economically feasible, long lasting and recreational.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
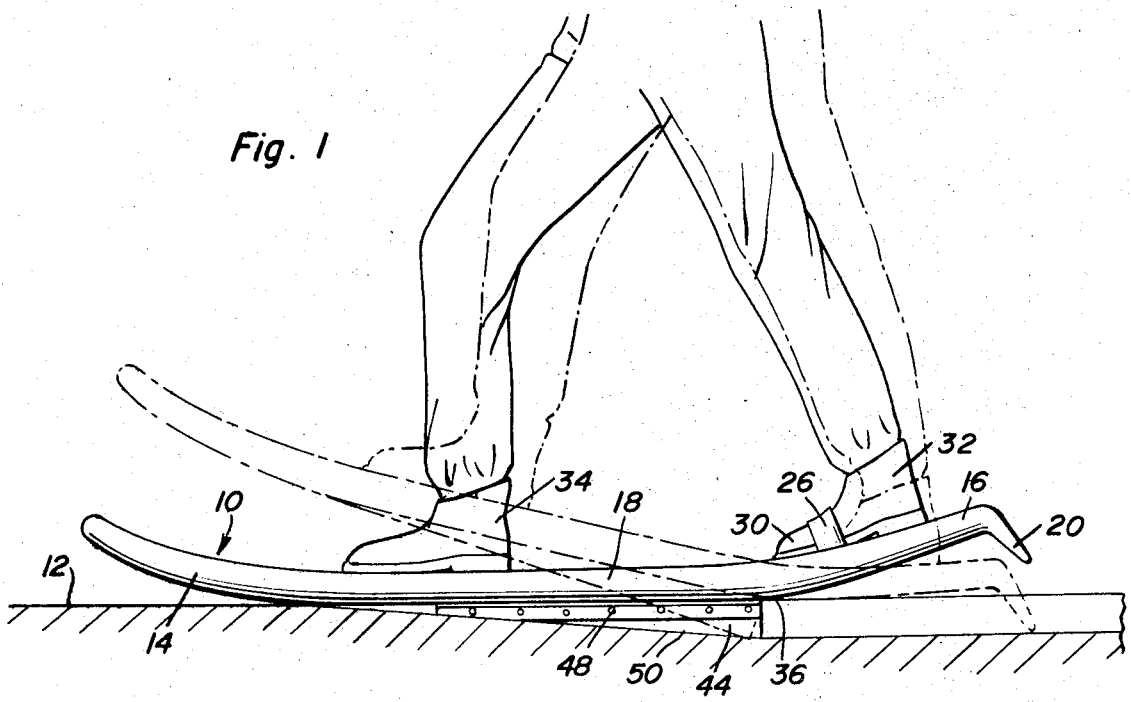
FIG. 1 is a side elevational view of the board in operation and with an alternate braking position of the board illustrated in phantom lines.
Figure 2:
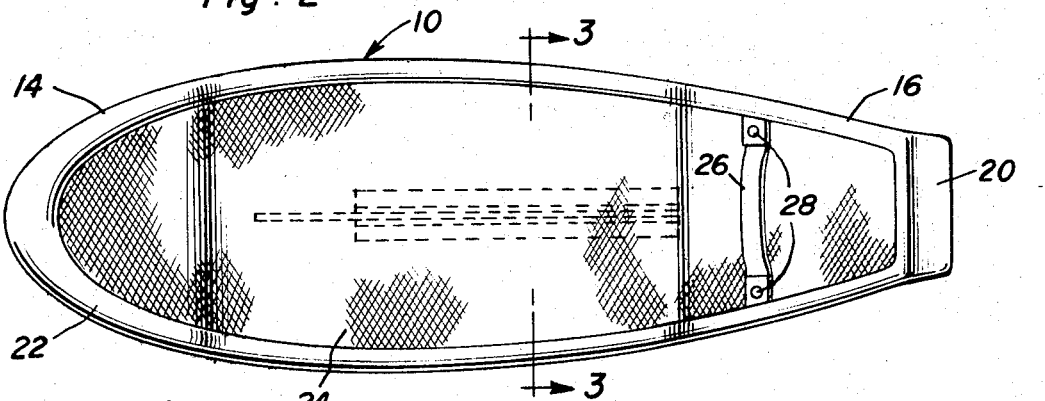
FIG. 2 is a top plan view of the board.

Referring now more specifically to the drawings, the numeral 10 generally designates the snow surfboard of the instant invention which may be seen in FIG. 1 of the drawings as being supported from a snow surface 12. The board 10 includes a forwardly and upwardly curving front end portion 14, a generally straight rearwardly and upwardly inclined rear end portion 16, and a generally horizontal center portion 18 interconnecting the front and rear end portions 14 and 16. The board 10 may be constructed of any suitable material such as plastic, aluminum, wood and fiber glass, etc. and the rear end portion 16 terminates rearwardly in a downturned transversely extending friction brake member 20 whose operation will be hereinafter more fully set forth.

The marginal edge portions of the board 10 are defined by a peripheral reinforcing bead 22 and the upper surface of the board 10 disposed inwardly of the reinforcing bead 22 has a panel 24 of any suitable nonskid material secured thereover in any convenient manner.

The opposite ends of a transversely extending strap 26 are secured to the upper surface portions of the rear end portion 16 by suitable fasteners 28 and it may be seen from FIG. 1 of the drawings that the strap 26 defines a toe strap beneath which the toe portion 30 of the rear foot 32 of the user of the board 10 may be engaged. The front foot 34 of the user of the board is placed slightly rearwardly of the forward end of the center portion 18 of the board 10 and it may be observed from FIG. 1 of the drawings that the brake member 20 may be swung downwardly into engagement with the surface 12 by the user shifting a greater portion of his weight to his rear foot 32 so as to urge downwardly on the rear end portion 16 of the board 10 thereby raising the front end portion 14 and engaging the brake member 20 with the surface 12.

The undersurface portions 36 of the board 10 at the juncture of the rear end portions 16 and the central portion 18 define a fulcrum area about which the board 10 may be pivoted from the solid line position thereof illustrated in FIG. 1 of the drawings to the dotted line position thereof illustrated in FIG. 1. If the board 10 is rocked excessively rearwardly to the phantom line position of FIG. 1, the brake member 20 is brought into engagement with the surface 12. However, if the board 10 is rocked only moderately over the fulcrum area 36, the brake member 20 is brought downwardly to a position spaced slightly above the surface 12 and the front end portion 14 and center portion 18 of the board 10 are swung upwardly out of engagement with the surface 12. When the board 10 is thus inclined, the user of the board may apply lateral forces on the board 10 with his feet 32 and 34 in order to angularly displace the board 10 about an upstanding axis so as to point the board 10 in a different direction and thereby change the course of movement of the board 10.

In order to prevent the board 10 from sliding to either side, a pair of angle brackets or flanges 40 are secured to the undersurface of the central portion 18 of the board 10 in any convenient manner such as by fasteners 42. A skeg plate 44 is secured between the opposing upstanding flange portions 46 of the angle brackets 40 and 42 by means of suitable fasteners 48 and the lower edge 50 of the plate 44 is slightly rearwardly and downwardly inclined relative to the center plane of the center portion 18 of the board 10. Thus, when the board 10 is moderately rocked rearwardly so as to lift the front end portion 14 and all but the rear end portion of the center portion 18 above the surface 12 preparatory to turning, only a small portion of the plate 44 penetrates the surface 12 thereby enabling some side sliding as the board 10 is angularly displaced about an upstanding axis to point it in a different direction. This slight amount of said sliding is sufficient to enable the user of the board to regain his balance after changing the direction in which the board 10 is pointed prior to the forward end of the board 10 being lowered to the solid line position thereof illustrated in FIG. 1 of the drawings and engaging the full length of the plate 44 with the surface 12.

The generally flat-bottomed center portion and skeg cooperate to provide a smooth ride without the board teetering from one side to the other. To change direction, the rider leans back slightly on his rear foot, which is placed on the rear end portion 16, and this shift in weight will cause the board to tip back onto its fulcrum point with the forward end of the board slightly raised. By then leaning to the right or to the left the rider can cause the board to pivot on its fulcrum point about a generally vertical axis to change the direction of travel. Once the direction has changed, the rider again leans forwardly to continue normal travel with the central portion flat against the snow surface. The board is stopped by the rider leaning back hard with his rear foot against the rear portion to force the brake down into the snow. The function of the skeg is to enhance straight line tracking of the board, yet permit a certain amount of transverse sliding as the rider negotiates turns. The amount of resistance to transverse sliding to controlled, in part, by how much of the skeg is below the snow surface. Employing a tapered skeg not only improves forward motion of the board over the snow but makes the board easier to manuever insofar as tilting back of the board clears most of the skeg from the snow which would not be the case with a skeg of uniform thickness.

Figure 4:
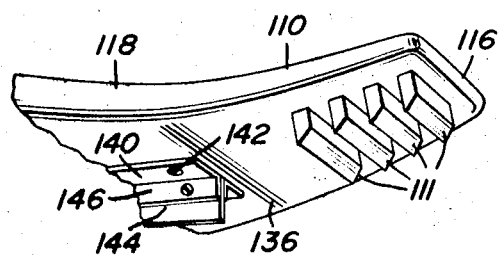
FIGS. 4 and 5 are fragmentary perspective views of the undersurface portions of the rear ends of a pair of modified forms of surfboards illustrating alternate forms of depending braking members which may be utilized on the board.
Figure 3:
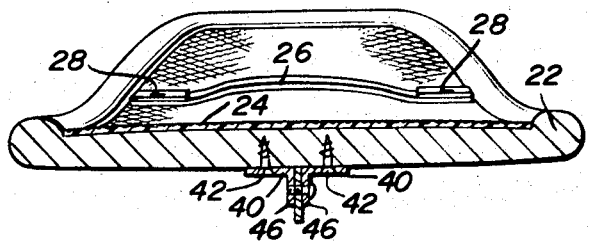
FIG. 3 is an enlarged transverse vertical sectional view taken substantially upon the plane indicated by the section line 3—3 of FIG. 2.
Figure 5:
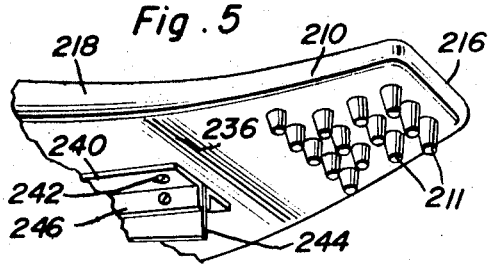

With attention now invited more specifically to FIGS. 4 and 5 of the drawings, there may be seen two modified forms of board 110 and 210 which are substantially identical to the board 10 except that the board 110 includes a plurality of longitudinally spaced and transversely extending elongated and depending lug portions 111 as brake members and the board 210 includes a plurality of longitudinally and transversely spaced elongated lugs 211 projecting endwise downwardly from the undersurface of the rear end portion 16 of the board 10 as brake members.

Other than the boards 110 and 210 being provided with modified forms of brake members, they are otherwise identical to the board 10 and corresponding components thereof have therefore been given numerals in the 100 and 200 series.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated horizontal board for standing upon with both feet and including a forward end portion which curves upwardly at least slightly toward its forward extremity, a substantially planar rear end portion which is angled rearwardly and upwardly toward its rear end, and a generally straight horizontal center portion interconnecting said front and rear end portions, the undersurface portions of said board at the juncture of said rear end portion and said center portion defining a fulcrum area onto which said board may be rearwardly rocked by greater downward foot pressure on the rear end portion from above preparatory to foot pressure being applied to either side of said board for changing the direction of forward motion, guide means disposed longitudinally on the undersurface portion of said center portion for guiding said board in a forward direction and extended to said fulcrum area, said rear end portion being formed with a depending friction brake member defining at least one transverse abutment the lowermost end of which terminates above a plane containing the undersurface of said central portion.

2. The combination of claim 1 wherein said rear end portion of said board includes downwardly opening strap means beneath which the toe portion of the rear foot of a person standing on said board may be placed.

3. The combination of claim 1 wherein said guide means includes a centrally disposed longitudinally extending and depending elongated shallow skeg terminating at said fulcrum area.

4. The combination of claim 3 wherein said skeg includes a generally straight lower edge portion which is slightly rearwardly and downwardly inclined.

5. The combination of claim 1 wherein said brake member comprises a rearwardly and downwardly inclined rear terminal end portion of said rear end portion and extending substantially the full width thereof.

6. The combination of claim 1 wherein said brake means comprises a plurality of longitudinally spaced and transversely extending elongated and depending lug portions carried by said rear end portion.

7. The combination of claim 1 wherein said brake means comprises a plurality of longitudinally and transversely spaced elongated lugs projecting endwise downwardly from the undersurface of said rear end portion.

* * * * *